(12) United States Patent
Sonoda et al.

(10) Patent No.: US 10,208,174 B2
(45) Date of Patent: Feb. 19, 2019

(54) RANDOM MAT AND FIBER-REINFORCED COMPOSITE MATERIAL SHAPED PRODUCT

(71) Applicant: Teijin Limited, Osaka-Shi, Osaka (JP)

(72) Inventors: Naoaki Sonoda, Osaka (JP); Makoto Ootsubo, Osaka (JP); Takeru Ohki, Osaka (JP)

(73) Assignee: Teijin Limited, Osaka-Shi, Osaka (JP)

( * ) Notice: Subject to any disclaimer, the term of this patent is extended or adjusted under 35 U.S.C. 154(b) by 7 days.

(21) Appl. No.: 15/872,006

(22) Filed: Jan. 16, 2018

(65) Prior Publication Data

US 2018/0134857 A1 May 17, 2018

Related U.S. Application Data

(63) Continuation of application No. 14/382,136, filed as application No. PCT/JP2013/070604 on Jul. 30, 2013.

(30) Foreign Application Priority Data

Jul. 31, 2012 (JP) .................................. 2012-169936

(51) Int. Cl.
*C08J 5/04* (2006.01)
*C08J 5/06* (2006.01)
(Continued)

(52) U.S. Cl.
CPC .................. *C08J 5/06* (2013.01); *C08J 5/042* (2013.01); *D01F 9/12* (2013.01); *D04H 1/4218* (2013.01);
(Continued)

(58) Field of Classification Search
CPC . C08J 5/06; C08J 5/042; C08J 2433/20; C08J 2323/12; D04H 1/72; D04H 1/58;
(Continued)

(56) References Cited

U.S. PATENT DOCUMENTS

| 4,677,818 A | 7/1987 | Honda et al. |
| 5,098,610 A | 3/1992 | Okamura et al. |

(Continued)

FOREIGN PATENT DOCUMENTS

| JP | 2008-254191 A | 10/2008 |
| JP | 4161409 B2 | 10/2008 |

(Continued)

OTHER PUBLICATIONS

Nov. 26, 2013—(EP) Search Report and Written Opinion—Application PCT/JP20131070604.
(Continued)

*Primary Examiner* — Michael N Orlando
*Assistant Examiner* — Joshel Rivera
(74) *Attorney, Agent, or Firm* — Banner & Witcoff, Ltd.

(57) ABSTRACT

There is provided a random mat including reinforcing fibers having an average fiber length of 3 to 100 mm and a thermoplastic resin, wherein the reinforcing fibers satisfy the following i) to iii).

i) The reinforcing fibers have a weight-average fiber width (Ww) which satisfies the following equation (1).

$$0 \text{ mm} < Ww < 2.8 \text{ mm} \tag{1}$$

ii) The reinforcing fibers have an average-fiber-width dispersion ratio (Ww/Wn), which is defined as a ratio of the weight-average fiber width (Ww) to a number-average fiber width (Wn), of 1.00 or more and 2.00 or less.

iii) The reinforcing fibers have a weight-average fiber thickness which is smaller than the weight-average fiber width (Ww) thereof.

11 Claims, 2 Drawing Sheets

(51) Int. Cl.

| | | |
|---|---|---|
| *D01F 9/12* | (2006.01) | |
| *D04H 1/58* | (2012.01) | |
| *D04H 1/72* | (2012.01) | |
| *D04H 1/4218* | (2012.01) | |
| *D04H 1/4242* | (2012.01) | |
| *D04H 1/4342* | (2012.01) | |

(52) U.S. Cl.
CPC .......... *D04H 1/4242* (2013.01); *D04H 1/4342* (2013.01); *D04H 1/58* (2013.01); *D04H 1/72* (2013.01); *C08J 2323/12* (2013.01); *C08J 2433/20* (2013.01); *Y10T 428/24479* (2015.01)

(58) Field of Classification Search
CPC .. D04H 1/4218; D04H 1/4242; D04H 1/4342; D01F 9/12; Y10T 428/24479
See application file for complete search history.

(56) References Cited

U.S. PATENT DOCUMENTS

| | | | |
|---|---|---|---|
| 6,025,285 | A | 2/2000 | Vyakarnam et al. |
| 6,066,395 | A | 5/2000 | Miyoshi et al. |
| 6,444,187 | B1 | 9/2002 | Miyoshi et al. |
| 6,607,798 | B1 | 8/2003 | Watanabe et al. |
| 2003/0157320 | A1 | 8/2003 | Rieder et al. |
| 2004/0137208 | A1 | 7/2004 | Mitani et al. |
| 2005/0264307 | A1 | 12/2005 | Setaka |
| 2006/0258810 | A1 | 11/2006 | Sugiura et al. |
| 2007/0077391 | A1 | 4/2007 | Okamoto et al. |
| 2007/0237954 | A1 | 10/2007 | Kienzle et al. |
| 2009/0004453 | A1 | 1/2009 | Murai et al. |
| 2009/0062426 | A1 | 3/2009 | Shiraki et al. |
| 2009/0169951 | A1 | 7/2009 | Suenaga et al. |
| 2013/0234361 | A1 | 9/2013 | Tsuchiya et al. |
| 2013/0317161 | A1 | 11/2013 | Konagai et al. |
| 2014/0080960 | A1* | 3/2014 | Konagai ................. C08J 5/042 524/495 |
| 2014/0186584 | A1 | 7/2014 | Arakawa et al. |

FOREIGN PATENT DOCUMENTS

| | | |
|---|---|---|
| JP | 2009-191116 A | 8/2009 |
| JP | 2011-178890 A | 9/2011 |
| JP | 2011-178891 A | 9/2011 |
| WO | 2007-097436 A1 | 8/2007 |
| WO | 2011093297 A1 | 8/2011 |
| WO | 2012-105080 A1 | 8/2012 |
| WO | 2013-035705 A1 | 3/2013 |
| WO | 2013-115337 A1 | 8/2013 |

OTHER PUBLICATIONS

Harper, L.T. et al., Composites: Part A vol. 38 (2007), pp. 755-770, "Characterisation of random carbon fibre compsites from a directed fibre preforming process: The effect of tow filamentisation".
Nov. 13, 2014—(PCT) Communication—App PCT/JP2013/070604.
Jespersen, S.T., Baudry, F., Wakeman, M.D., Michaud, V., Blanchard, P., Norris R, and Manson J-A.E., "Consolidatio of Net-shape Random Fiber Thermoplastic Composite Preforms,"—identified as Document 1 submitted with third party observation dated Nov. 12, 2014 in International Application JP2013/070604.
Polymer Composites 653(2010) Fig. 6. (a2) (b) (c)—identified as Document 2 submitted with third party observation dated Nov. 12, 2014 in International Application No. JP2013/070604.
Vyakarnam, Murty N. and Drzal, Lawrence T., "Novel Processing and Performance of Aligned Discontinuous Fiber Polymer Composites," ANTEC '96, pp. 2531-2535—identified as Document 3 submitted with third party observation dated Nov. 12, 2014 in International Application JP2013/070604.
ANTEC 196 p. 2531, Figure 4—identified as Document 5 submitted with third party observation dated Nov. 12, 2014 in International Application JP2013/070604.
Carver 100th Anniversary 1912-2012, Laboratory Presses and Accessories, Bulletin 212C, ISO 9001:2008, identified as Document 7 submitted with third party observation dated Nov. 12, 2014 in International Application JP2013/070604.
Jan. 5, 2015—(EP) Supplementary European Search Report—App 13825586.4—Eng Tran.
Jan. 26, 2015—(EP) Office Action—App 13825586.4.
Jul. 17, 2015—(US) Non-Final Office Action—U.S. Appl. No. 14/382,136.
Hearn, E.J., "Mechanics of Materials, vol. 1—An Introduction to the Mechanics of Elastic and Plastic Deformation of Solids and Structural Materials", Dec. 1997, Elsevier, 3rd Edition, p. 254-296.
Aug. 12, 2015—(EP)—Communication re: Third Party Observations—App 13825586.4.
Jespersen, S.T., Baudry, F., Wakeman, M.D., Michaud, V., Blanchard, P., Norris, R., and J-A.E. Manson, "Consolidation of Net-shape Random Fiber Thermoplastic Composite Preforms," Polymer Composites, 2010, pp. 653-665.
Vyakamam, Murty N. and Drzal, Lawrence T., "Novel Processing and Performance of Aligned Discontinuous Fiber Polymer Composites," May 5, 1996, ANTEC '96, pp. 2531-2535.
Harper, Lee T., Turner, Thomas A., and Warrior, Nicholas A., "A Random Fibre Network Model for Predicting the Stochastic Effects of Discontinuous Fibre Composites," 16th Annual International Conference on Composite Materials, Jul. 13, 2007, pp. 1-10.
Pimenta, Soraia and Pinho, Silvestre T., "The influence of micromechanical properties and reinforcement architecture on the mechanical response of recycled composites," Aug. 24, 2013 Composites: Part A 56 (2014) pp. 213-225.
Nov. 5, 2015—(US)—Final Office Action—U.S. Appl. No. 14/382,136.
Sep. 24, 2015—(EP) Examination Report—App 13825586.4.
May 23, 2016—(EP) Third Party Observations—App 13825586.4.
Harper, Lee T., Turner, Thomas A., and Warrior, Nicholas A., "A Random Fibre Network Model for Predicting The Stochastic Effects of Discontinuous Fibre Composites," 16th International Conferene on Composite Materials. Jul. 13, 2007, pp. 1-10—Also Including Enlarged Parts I-IV of Figure 1.
Jul. 1, 2016—(US) Non-Final Office Action—U.S. Appl. No. 14/382,136.
Nov. 18, 2016—(US) Final Office Action—U.S. Appl. No. 14/382,136.
Dec. 21, 2016—(EP) Office Action—App 13 825 586.4.
Jun. 1, 2017—(US) Non-Final Office Action—U.S. Appl. No. 14/382,136.
Oct. 20, 2017—(US) Final Office Action—U.S. Appl. No. 14/382,136.

\* cited by examiner

RANDOM MAT AND FIBER-REINFORCED COMPOSITE MATERIAL SHAPED PRODUCT

CROSS REFERENCE TO RELATED APPLICATIONS

This application is a continuation of U.S. application Ser. No. 14/382,136, filed Aug. 29, 2014, which is a U.S. National Phase Application under 35 U.S.C. § 371 of International Application No. PCT/JP2013/070604, filed Jul. 30, 2013, which claims priority to Japanese Application 2012-169936 filed Jul. 31, 2012, and which was published Under PCT Article 21(2), the entire contents of which are incorporated herein by reference.

TECHNICAL FIELD

The present invention relates to a random mat for use as an intermediate material for fiber-reinforced composite material shaped products in which a thermoplastic resin is used as the matrix, and to a fiber-reinforced composite material shaped product obtained from the random mat.

BACKGROUND ART

Random mats, which are isotropic, are used as fiber-reinforced composite materials in which carbon fibers, aramid fibers, glass fibers, and the like are used as reinforcing fibers, from the standpoints of formability and process simplicity. These random mats can be obtained, for example, by the spray-up method (dry process) in which cut reinforcing fibers are blown into a shaping die either alone or simultaneously with a thermosetting resin or by a method (wet process) in which reinforcing fibers which have been cut in advance are added to a binder-containing slurry and this mixture is formed into a sheet by a papermaking method.

Known as a means for improving the mechanical properties of a composite material is to heighten the volume content ratio of reinforcing fibers (Vf). In the case of random mats employing cut fibers, however, it has been difficult to heighten the volume content ratio of reinforcing fibers because of the presence of fibers oriented in three-dimensional directions, considerable fiber entanglement, etc. Furthermore, in the case of using random mats, it is difficult to enable the reinforcing fibers to sufficiently exhibit the strength thereof since the fibers are discontinuous, as compared with the case where continuous fibers are used, and there has been a problem in that in a shaped product obtained, the development rate of strength of the reinforcing fibers is as low as up to 50% of the theoretical value. Non-patent document 1 mentions a composite material produced from a carbon-fiber random mat employing a thermosetting resin as the matrix. In this composite material, the development rate of strength is about 44% of the theoretical value.

In the case of conventional composite materials employing a thermosetting resin as the matrix, shaped products have been obtained from intermediate materials called prepregs, which were obtained by impregnating a reinforcing-fiber base material with a thermosetting resin in advance, by heating and pressing the intermediate materials for 2 hours or longer using an autoclave. In recent years, an RTM method has been proposed in which a reinforcing-fiber base material impregnated with no resin is set in a mold and a thermosetting resin is then casted thereinto, and a remarkable reduction in shaping time has been attained. However, even in the case of using the RTM method, 10 minutes or a longer period is required for each component to be shaped.

Consequently, composite materials obtained using a thermoplastic resin as the matrix, in place of the conventional thermosetting resin, are attracting attention.

Thermoplastic stamping (TP-SMC) in which a thermoplastic resin is used as the matrix (patent document 1) is a molding method which includes heating chopped fibers impregnated in advance with a thermoplastic resin to or above the melting point, introducing the heated fibers into some of the cavity of a mold, immediately closing the mold, and causing the fibers and the resin to flow within the mold to thereby obtain the shape of a product, followed by cooling and molding. In this technique, molding can be completed in a period as short as about 1 minute by using fibers impregnated with a resin in advance. Such techniques are methods in which molding materials called SMCs or stampable sheets are used. The thermoplastic stamping has had problems, for example, in that since the fibers and the resin are caused to flow within the mold, thin-walled products cannot be molded and fiber orientation is disordered and difficult to control.

Patent document 2 proposes, as a means for improving mechanical properties and the isotropy in a fiber-reinforced thermoplastic resin shaped product, a technique wherein constituent carbon fibers are evenly dispersed into a single fiber form to thereby avoid the trouble that resin-rich portions are formed at the spaces between fiber bundles or that the resin cannot be impregnated into inner parts of fiber bundles, resulting in unimpregnated portions, and to thereby improve mechanical properties and the isotropy thereof.

CITATION LIST

Patent Documents

Patent Document 1: Japanese Patent No. 4161409
Patent Document 2: International Publication WO 2007/097436

Non-Patent Document

Non-Patent Document 1: Composites, Part A 38 (2007) pp. 755-770

SUMMARY OF THE INVENTION

Problems that the Invention is to Solve

However, in the conventional-art techniques described above, no investigations have been made on a fiber-reinforced composite material shaped product which is even in mechanical strength, has excellent tensile strength, and has a high development rate of strength relative to a theoretical strength.

An objective of the invention is to provide a fiber-reinforced composite material shaped product which is isotropic and has excellent mechanical strength and a random mat for use as an intermediate material therefor. In particular, the invention is to provide a fiber-reinforced composite material shaped product which is a fiber-reinforced composite material shaped product obtained from the random mat and in which the reinforcing-fiber mat included therein has small unevenness of thickness, is even in mechanical strength, and has excellent tensile strength and a high development rate of strength.

Means for Solving the Problems

The present inventors have found that a fiber-reinforced composite material shaped product which is excellent in terms of mechanical strength, isotropy thereof, and strength development can be provided by a random mat which includes both a thermoplastic resin and discontinuous reinforcing fibers having specific values of weight-average fiber width, average-fiber-width dispersion ratio, and weight-average fiber thickness. The invention has been thus completed. More specifically, the inventors have found that by regulating reinforcing fibers so as to be small and be similar in fiber width, the reinforcing fibers can be densely incorporated into a random mat and a fiber-reinforced composite material shaped product which is even and has excellent mechanical strength and a high development rate of strength can be provided.

Namely, the present invention is: a random mat which includes reinforcing fibers having an average fiber length of 3-100 mm and a thermoplastic resin, wherein the reinforcing fibers satisfy the following i) to iii); and a fiber-reinforced composite material shaped product obtained by shaping the random mat.

i) The reinforcing fibers have a weight-average fiber width (Ww) which satisfies the following equation (1).

$$0 \text{ mm} < Ww < 2.8 \text{ mm} \tag{1}$$

ii) The reinforcing fibers have an average-fiber-width dispersion ratio (Ww/Wn) of 1.00 or more and 2.00 or less.
iii) The reinforcing fibers have a weight-average fiber thickness which is smaller than the weight-average fiber width (Ww) thereof.

Effects of the Invention

According to the invention, in the random mat including a thermoplastic resin and reinforcing fibers, the reinforcing fibers contained therein have a specific fiber width distribution. Namely, the random mat of the invention contains reinforcing fibers which are small and similar in fiber width, and is excellent in terms of the development of the reinforcing function of the fibers, is homogeneous, and has excellent mechanical strength. Furthermore, the random mat of the invention is isotropic because the fibers are not aligned in a specific in-plane direction, and shows highly excellent moldability when used as an intermediate molding material.

Consequently, the fiber-reinforced composite material shaped product obtained from the random mat of the invention has excellent mechanical strength and is excellent in terms of the isotropy thereof. This shaped composite material is hence usable as various constituent members, such as inside plates, outside plates, and constituent members for motor vehicles, the frames or housings of various electrical products or machines, or the like.

EMBODIMENTS FOR CARRYING OUT THE INVENTION

Figure 1:
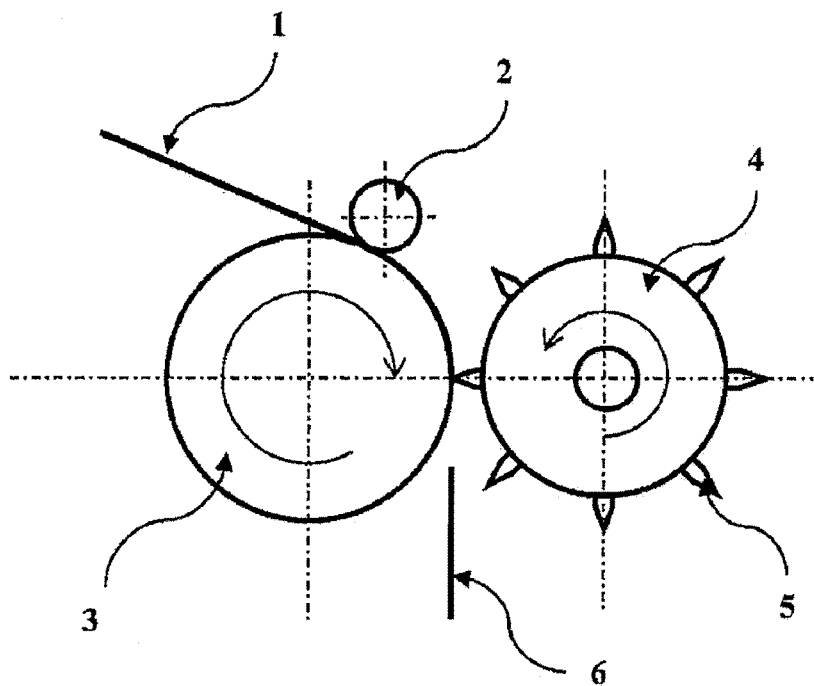
FIG. 1 is a schematic view which illustrates one example of cutting processes employing a rotary cutter.

Embodiments of the invention will be explained below in order. Hereinafter, although the term "weight" will be frequently used in relation to the present invention, the "weight" in each appearance means "mass".

The present invention relates to a random mat which includes reinforcing fibers having an average fiber length of 3 to 100 mm and a thermoplastic resin, wherein the reinforcing fibers satisfy the following i) to iii).
i) The reinforcing fibers have a weight-average fiber width (Ww) which satisfies the following equation (1).

$$0 \text{ mm} < Ww < 2.8 \text{ mm} \tag{1}$$

ii) The reinforcing fibers have an average-fiber-width dispersion ratio (Ww/Wn), which is defined as the ratio of the weight-average fiber width to a number-average fiber width, of 1.00 to 2.00.
iii) The reinforcing fibers have a weight-average fiber thickness which is smaller than the weight-average fiber width (Ww) thereof.

The weight-average fiber width (Ww) of the reinforcing fibers contained in the random mat of the invention can be determined using the following equation (5) from the width (hereinafter sometimes expressed by fiber width or W) and weight (hereinafter sometimes expressed by fiber weight or w) of each of a sufficiently large number of reinforcing fibers taken out from the random mat (preferably 200 to 1,000 fibers, more preferably 300 to 1,000 fibers, e.g., 300 fibers, taken out from a random mat piece cut out in a size of 100 mm×100 mm) and from the total weight (w) of the reinforcing fibers taken out.

$$Ww = \Sigma(W_i \times w_i / w) \tag{5}$$

In equation (5), i is a natural number of 1 to the number of the reinforcing fibers taken out from the random mat.

With respect to the random mat of the invention, the weight-average fiber width (Ww) of the reinforcing fibers is less than 2.8 mm as shown by equation (1), and is preferably less than 2.0 mm. The weight-average fiber width (Ww) thereof is preferably larger than 0.1 mm and less than 2.0 mm, i.e., represented by the following equation (2):

$$0.1 \text{ mm} < Ww < 2.0 \text{ mm} \tag{2}$$

and is more preferably larger than 0.2 mm and less than 1.6 mm, even more preferably larger than 0.2 mm and less than 1.4 mm, and especially preferably larger than 0.3 mm and less than 1.2 mm. In case where the weight-average fiber width (Ww) of the reinforcing fibers is 2.8 mm or more, these reinforcing fibers are not small and are hence difficult to densely incorporate into the random mat. There are hence cases where the random mat has a problem in that the development of properties (strength) is poor and the random mat has impaired homogeneity. There is no particular lower limit on the weight-average fiber width (Ww) of the reinforcing fibers. However, in the case of widening and separating reinforcing fibers in order to reduce the Ww to an excessively small value, there is the possibility of resulting, for example, in difficulties in controlling the fiber-width dispersion ratio.

In the random mat of the invention, the average-fiber-width dispersion ratio (Ww/Wn), which is defined as the ratio of the weight-average fiber width (Ww) to the number-average fiber width (Wn), of the reinforcing fibers contained therein is 1.00 or more and 2.00 or less, and is preferably 1.30 or more and 1.95 or less, more preferably 1.40 or more and 1.90 or less. In cases when this average-fiber-width dispersion ratio (Ww/Wn; hereinafter often abbreviated simply to "dispersion ratio") is 1.00 or more and 2.00 or less, the reinforcing fibers are similar in fiber width and give a random mat which has enhanced homogeneity and in which the development rate of strength is higher. Meanwhile, the lower limit of the Ww/Wn is 1 because of the definition. Except for, for example, the case where reinforcing fibers are completely opened into single fibers, it is necessary, for obtaining reinforcing fibers in which Ww/Wn is exactly 1, to perform an operation such as a process in which reinforcing fibers other than the desired ones are sorted out or an operation for precisely regulating and fixing the fiber width in advance, resulting in exceedingly troublesome production processes. However, the random mat in which Ww/Wn=1 is more preferred from the standpoint of homogeneity. From the standpoint of the ease of operations for processing and sorting reinforcing fibers, the average-fiber-width dispersion ratio (Ww/Wn) is preferably higher than 1, more preferably 1.30 or higher.

Here, the number-average fiber width (Wn) is determined by taking a sufficiently large number (I) of reinforcing fibers out of the random mat in the manner described above with regard to the weight-average fiber width (Ww), measuring the width ($W_i$) of each of these fibers, and calculating a value of Wn using the following equation (4).

$$Wn=\Sigma W_i/I \qquad (4)$$

The reinforcing fibers contained in the random mat of the invention have a weight-average fiber thickness which is smaller than the weight-average fiber width (Ww) thereof. The weight-average fiber thickness thereof is desirably ⅕ or less, preferably 1/10 or less, more preferably 1/20 or less, even more preferably 1/50 or less, of the weight-average fiber width (Ww) thereof. In case where the weight-average fiber thickness of the reinforcing fibers is equal to the weight-average fiber width (Ww) thereof, these reinforcing fibers are undesirably oriented not only in in-plane directions but also in the thickness direction and there is the possibility of arousing a problem that fiber entanglements make it difficult to heighten the volume content ratio of the reinforcing fibers.

In the invention, of the dimensions along the two directions other than the longitudinal direction of a reinforcing fiber, the shorter one is referred to as "thickness" and the other is referred to as "width". In the case where the dimensions respectively along two perpendicular directions in a cross-section which is perpendicular to the longitudinal direction of a reinforcing fiber are equal to each other, the dimension along any of the two directions is taken as the width of the reinforcing fiber and the dimension along the other is taken as the thickness of the reinforcing fiber.

The weight-average fiber thickness of the reinforcing fibers contained in the random mat of the invention is preferably 0.01 mm or more and 0.30 mm or less, more preferably 0.02 mm or more and 0.20 mm or less, even more preferably 0.03 mm or more and 0.15 mm or less, especially preferably 0.03 mm or more and 0.10 mm or less. So long as the weight-average fiber thickness of the reinforcing fibers is 0.01 mm or more, there is no need of performing fiber widening to an exceedingly large width and the resultant unevenness in fiber thickness is apt to be slight. From the standpoint of impregnation with a thermoplastic resin as the matrix, it is preferable that the weight-average fiber thickness of the reinforcing fibers should be 0.30 mm or less.

Meanwhile the weight-average fiber thickness (t) of the reinforcing fibers can be determined by measuring the fiber thickness ($t_i$) and fiber weight ($w_i$) of each of all reinforcing fibers taken out by conducting the same operation as shown above with regard to the weight-average fiber width (Ww) and further measuring the total weight (w) of the reinforcing fibers taken out, and then calculating a value oft using the following equation (7).

$$t=\Sigma(t_i \times w_i/w) \qquad (7)$$

Within the plane of the random mat of the invention, the reinforcing fibers are not aligned in any specific direction but have been arranged dispersedly in random directions. The random mat of the invention is an intermediate material having in-plane isotropy. In the shaped product obtained by processing the random mat of the invention, the isotropy of the reinforcing fibers in the random mat is maintained. By obtaining a shaped product from the random mat and determining the tensile-modulus ratio between two directions perpendicular to each other, the isotropy of the random mat and that of the shaped product obtained therefrom can be quantitatively evaluated. In cases when the ratio obtained by dividing the larger one of the values of modulus for the two directions in the shaped product obtained from the random mat by the smaller one does not exceed 2, this shaped product is regarded as isotropic. In cases when that ratio does not exceed 1.3, this shaped product is regarded as having excellent isotropy.

As described above, the random mat of the invention is constituted by including: reinforcing fibers having specific values of weight-average fiber width, average-fiber-width dispersion ratio, and weight-average fiber thickness; and a thermoplastic resin. It is preferable that the random mat of the invention be constituted by including: a reinforcing-fiber mat constituted by the reinforcing fibers; and a thermoplastic resin. The term "reinforcing-fiber mat" in the invention means a planar body (mat-shaped object) which contains no thermoplastic resin as a matrix and is constituted by discontinuous reinforcing fibers. The reinforcing-fiber mat according to the invention may be one in which the reinforcing fibers contain a sizing agent or a binder used in a small amount during the mat formation. It is preferable that the reinforcing-fiber mat be a mat in which the reinforcing fibers have been randomly oriented in in-plane directions and the in-plane longitudinal and transverse directions are substantially equal in material property to each other.

The kind of the reinforcing fibers is not particularly limited, and the reinforcing fibers may be of one kind or a mixture of two or more kinds.

With respect to the form of the thermoplastic resin in the random mat of the invention, the random mat may be one which includes a reinforcing-fiber mat that contains a thermoplastic resin in the form of a powder, fibers, lumps, or the like, or may be one in which a reinforcing-fiber mat is held by a thermoplastic resin as the matrix, or may be one in which a thermoplastic resin in the form of a sheet, film, or the like has been placed on or layered to a reinforcing-fiber mat. The thermoplastic resin in the random mat may be in a molten state.

It is a matter of course that in cases when the reinforcing-fiber mat included in the random mat of the invention is examined to determine the weight-average fiber width (Ww), fiber-width dispersion ratio (Ww/Wn), and the like thereof, these values can be regarded as those for the random mat.

The random mat of the invention as such may be used as a preform in obtaining a shaped fiber-reinforced material (hereinafter often referred to simply as "shaped product") having a final form. Alternatively, the random mat may be used in such a manner that the thermoplastic resin is impregnated by heating, and the like, to obtain a prepreg and this prepreg is used for obtaining a shaped product having a final form. The random mat of the invention includes the prepreg into which the thermoplastic resin is impregnated.

The term "shaped product having a final form" herein means a shaped product which has been obtained by pressing and heating either the random mat or a shaped plate formed therefrom and which has not undergone further heating or pressing (i.e., further molding) for melting the thermoplastic resin as a matrix and imparting another shape or thickness thereto.

Consequently, a product produced by cutting the shaped product, which was obtained by pressing and heating the random mat or the like, into another shape or a product obtained by grinding the shaped product to reduce the thickness thereof or by applying a resin or the like to the shaped product to increase the thickness thereof is a shaped product having a final form, because such processing involves neither heating nor pressing. Also, use of heat as a means for cutting or processing is not regarded as the heating herein.

In the case where the random mat to which a thermoplastic resin in a molten state has been supplied is molded, while keeping the supplied thermoplastic resin in the molten state, a shaped product is obtained, for example, by molding with pressing alone.

The random mat of the invention as such may be subjected, as a preform, to molding, or may be converted to a shaped plate and then subjected to molding. A fiber areal weight can be selected from a wide range in accordance with desired molding. However, the reinforcing-fiber areal weight in the random mat is desirably 25 to 10,000 $g/m^2$, preferably 50 to 4,000 $g/m^2$, more preferably 600 to 3,000 $g/m^2$, even more preferably 600 to 2,200 $g/m^2$.

Since the reinforcing fibers contained in the random mat of the invention have the specific values of weight-average fiber width, average-fiber-width dispersion ratio, and weight-average fiber thickness, the plane of the random mat includes the fibers which are small and similar in size and the reinforcing-fiber mat included in the random mat has exceedingly low thickness unevenness. Consequently, the fiber-reinforced composite material shaped product obtained by molding the random mat is homogeneous and is excellent in terms of the development of the properties of the reinforcing fibers. As an index to the thickness unevenness, a coefficient of variation CV (%) can be used. One example of procedures for determining the CV (%) of the thickness of the reinforcing-fiber mat included in the random mat is shown below.

First, a square platy specimen having an appropriate size, e.g., 100×100 mm, is cut out from the random mat, and the thermoplastic resin is separated therefrom. This reinforcing-fiber mat is put into a sealable bag, which is depressurized to −0.09 MPa or less. Marks are put, at intervals of 10 mm in a lattice pattern, on the bag with which the specimen is covered, and the thickness thereof is measure with a micrometer down to the order of 1/1,000 mm. The measurement is made on five lines×five rows, i.e., on 25 points. The thickness of the bag is subtracted from each measured thickness, and an average value and a standard deviation are calculated. The coefficient of variation CV (%) of the thickness of the reinforcing-fiber mat can be calculated using the following expression.

$$\text{Coefficient of variation CV (\%)} = [(\text{standard deviation})/(\text{average value})] \times 100 \qquad (3)$$

In the case where the thermoplastic resin is unable to be separated from the random mat, making it impossible to determine the thickness unevenness of the reinforcing-fiber mat, measurements are made after the thermoplastic resin is removed through heating in the same manner as for fiber-reinforced composite material shaped products which will be described later.

Meanwhile, the degree of thickness unevenness of the reinforcing-fiber mat in the random mat is maintained with respect to the reinforcing fibers included in the fiber-reinforced composite material shaped product obtained by molding the random mat.

Reinforcing Fibers

The reinforcing fibers contained in the random mat are discontinuous, and are characterized in that the reinforcing function can be exhibited due to the inclusion of reinforcing fibers which are long to some degree. The fiber length is expressed in terms of an average fiber length determined by measuring the lengths of reinforcing fibers contained in the random mat obtained. Examples of methods for determining the average fiber length include a method in which the lengths of randomly taken out 100 fibers are measured with a vernier caliper or the like down to the order of 1 mm and an average thereof is determined.

The average fiber length of the reinforcing fibers in the random mat of the invention is 3 mm or more and 100 mm or less, desirably 5 mm or more and 80 mm or less, preferably 10 mm or more and 80 mm or less, more preferably 10 mm or more and 60 mm or less, even more preferably 12 mm or more and 45 mm or less. With respect to fiber length distribution, the fibers may have a single length or may be a mixture of two or more kinds of fibers differing in length.

In the case where reinforcing fibers are cut into a fixed length by the preferred method for reinforcing-fiber cutting which will be described later and the cut reinforcing fibers are used to produce a random mat, the average fiber length is equal to the length of the cut fibers.

It is preferable that the reinforcing fibers should be at least one kind of fibers selected from the group consisting of carbon fibers, aramid fibers, and glass fibers. It is preferable that the reinforcing fibers constituting the random mat should be carbon fibers, from the standpoint that composite materials which are lightweight but and have excellent strength can be provided therewith. Generally known as the carbon fibers are polyacrylonitrile-based carbon fibers (hereinafter often abbreviated to PAN-based carbon fibers), petroleum pitch-based carbon fibers, coal pitch-based carbon fibers, rayon-based carbon fibers, cellulose-based carbon fibers, lignin-based carbon fibers, phenol-based carbon fibers, vapor-phase-grown carbon fibers, and the like. In the invention, any of these carbon fibers are suitable for use. Especially preferred are PAN-based carbon fibers. One of these kinds of carbon fibers may be used alone, or a mixture of two or more kinds may be used. The reinforcing fibers to be used in the random mat of the invention may be carbon fibers alone, or may be fibers which include glass fibers, aramid fibers, or other fibers for the purpose of, for example, imparting impact resistance.

In the case of carbon fibers, the average fiber diameter thereof is preferably 1 to 50 μm, more preferably 3 to 12 μm, even more preferably 5 to 9 μm, still even more preferably 5 to 7 μm.

It is preferable that the carbon fibers to be used should be ones to which a sizing agent is adherent. The amount of the sizing agent is preferably larger than 0 part and not larger than 10 parts by weight per 100 parts by weight of the carbon fibers.

The reinforcing fibers in the invention may be in the state of being opened into a single fiber form, or may be in a form of fiber bundles each made up of a plurality of single fibers put together, or may be in a state in which single fibers coexist with fiber bundles.

Matrix Resin

The matrix resin contained in the random mat of the invention is a thermoplastic resin. Examples of the kind of the thermoplastic resin include one or more resins selected from the group consisting of vinyl chloride resins, vinylidene chloride resins, vinyl acetate resins, poly vinyl alcohol resins, polystyrene resins, acrylonitrile-styrene resins (AS resins), acrylonitrile-butadiene-styrene resins (ABS resins), acrylic resins, methacrylic resins, polyethylene resins, polypropylene resins, polyamide-6 resins, polyamide-11 resins, polyamide-12 resins, polyamide-46 resins, polyamide-66 resins, polyamide-610 resins, polyacetal resins, polycarbonate resins, polyethylene terephthalate resins, polyethylene naphthalate resins, polybutylene naphthalate resins, polybutylene terephthalate resins, polyarylate resins, polyphenylene ether resins, polyphenylene sulfide resins, polysulfone resins, polyether sulfone resins, polyetheretherketone resins, polylactic acid resins, and the like. In the invention, these thermoplastic resins may be used alone or as a mixture of two or more thereof, or may be used after having been converted to copolymers or modifications.

The amount of the matrix resin present, per 100 parts by weight of the reinforcing fibers, is desirably 10 to 800 parts by weight, preferably 20 to 300 parts by weight, more preferably 20 to 200 parts by weight, even more preferably 30 to 150 parts by weight, especially preferably 50 to 100 parts by weight.

The relationship between the content of the reinforcing fibers and that of the thermoplastic resin can be expressed also by the volume content ratio of reinforcing fibers (hereinafter often abbreviated to Vf) defined by the following expression.

Volume content ratio of reinforcing fibers (vol %)=100×[(volume of reinforcing fibers)/[(volume of reinforcing fibers)+(volume of thermoplastic resin)]]

This volume content ratio of reinforcing fibers (Vf) and the content of the thermoplastic resin, which is expressed in terms of parts by weight per 100 parts by weight of the reinforcing fibers, are converted using the density of the reinforcing fibers and the density of the thermoplastic resin.

The random mat of the invention may contain any of various fibrous, including organic fibers or inorganic fibers, or non-fibrous fillers, and additives such as a flame retardant, UV resistance improver, pigment, release agent, softener, plasticizer, and surfactant, so long as these ingredients do not depart from the purposes of the invention.

Fiber-Reinforced Composite Material Shaped Product

The random mat of the invention further has the advantage of having high formability since the constituent reinforcing fibers have the features described above. The random mat of the invention can hence be advantageously used as an intermediate material for obtaining a fiber-reinforced composite material shaped product.

Namely, the present invention involves, as one aspect of the invention, a fiber-reinforced composite material shaped product obtained from the random mat.

It is preferable that the fiber-reinforced composite material shaped product of the invention includes reinforcing fibers having an average fiber length of 3 to 100 mm and a thermoplastic resin, wherein the reinforcing fibers satisfy the following i) to iii).

i) The reinforcing fibers have a weight-average fiber width (Ww) which satisfies the following equation (1).

$$0 \text{ mm} < Ww < 2.8 \text{ mm} \tag{1}$$

ii) The reinforcing fibers have a dispersion ratio (Ww/Wn), which is defined as the ratio of the weight-average fiber width (Ww) to a number-average fiber width (Wn), of 1.00 or more and 2.00 or less.

iii) The reinforcing fibers have a weight-average fiber thickness which is smaller than the weight-average fiber width (Ww) thereof.

The thickness of the fiber-reinforced composite material shaped product of the invention may be regulated to a value within an appropriate range preferably by controlling the areal weight of the reinforcing fibers contained and the content of the thermoplastic resin.

The kind of the reinforcing fibers constituting the fiber-reinforced composite material shaped product of the invention is not particularly limited, and preferred examples thereof include the fibers enumerated above in the section Reinforcing Fibers in the explanation of the random mat.

The kind of the resin constituting the fiber-reinforced composite material shaped product of the invention is not particularly limited, and preferred examples thereof include the resins enumerated above in the section Matrix Resin in the explanation of the random mat.

The content of the thermoplastic resin present in the fiber-reinforced composite material shaped product of the invention, per 100 parts by weight of the reinforcing fibers, is desirably 10 to 800 parts by weight, preferably 20 to 300 parts by weight, more preferably 20 to 200 parts by weight, even more preferably 30 to 150 parts by weight, especially preferably 50 to 100 parts by weight, as stated above in relation to the amount of the thermoplastic resin in the random mat.

The shape of the fiber-reinforced composite material shaped product according to the invention is not particularly limited. The shape thereof may be the shape of a sheet or plate and may have a curved portion, or may be one having a standing plane such as one having a T-shaped, L-shaped, U-shaped, or hat-shaped cross-section. Furthermore, the shaped product may have a three-dimensional shape including these.

The fiber-reinforced composite material shaped product of the invention can be made to have a wall thickness selected from a wide range, e.g., a wall thickness of 0.2 to 100 mm. However, even when the shaped product has a smaller wall thickness, the properties and appearance thereof can be rendered highly excellent. Specifically, the wall thickness of the shaped product can be 0.2 to 2.0 mm (in terms of wall thickness measured at 25° C. if strict definition is necessary).

The reinforcing-fiber areal weight in the fiber-reinforced composite material shaped product is preferably 25 to 10,000 g/m$^2$, preferably 50 to 4,000 g/m$^2$, more preferably 600 to 3,000 g/m$^2$, even more preferably 600 to 2,200 g/m$^2$.

The present invention furthermore includes a layered body in which at least one fiber-reinforced composite material shaped product of the invention is used as a core material or as a skin layer. The layered body of the invention may further contain at least one unidirectionally fiber-reinforced composite material, in which continuous reinforcing fibers are arranged so as to be unidirectionally aligned, as a core material or a skin layer. Furthermore, the layered body of the invention may contain, as a core material or a skin layer, at least one fiber-reinforced composite material shaped product (hereinafter, referred to as "other fiber-reinforced composite material shaped product(s)") other than the fiber-reinforced composite material shaped product of the invention and other than unidirectionally fiber-reinforced composite materials. The layered body of the invention may still further contain at least one resin including no reinforcing fibers, as a core material or a skin layer.

The matrix resins of the unidirectionally fiber-reinforced composite material and of the other fiber-reinforced composite material shaped product and the resin including no reinforcing fibers may be either thermosetting resins or thermoplastic resins.

Since the fiber-reinforced composite material shaped product of the invention is one in which the reinforcing fibers contained therein have specific values of weight-average fiber width, average-fiber-width dispersion ratio, and weight-average fiber thickness, the reinforcing-fiber mat contained therein has extremely low thickness unevenness. As an index to the thickness unevenness, a coefficient of variation CV (%) can be used.

One example of procedures for determining the CV (%) of the reinforcing-fiber mat contained in the fiber-reinforced composite material shaped product is shown below.

First, a specimen having an appropriate size, e.g., 100 mm×100 mm, is cut out from the shaped product of a flat plate shape, and this specimen is heated in an oven at about 500° C. for about 1 hour to remove the resin. Dimensions of this specimen from which the resin has been removed are measured, and the test specimen is placed on a smooth flat plate. Thereafter, the flat plate on which the specimen is placed is put into a sealable bag, and the thickness is measured on 25 points in the manner described above with regard to the determination of the thickness unevenness of the reinforcing-fiber mat contained in the random mat. The thickness of both the bag and the flat plate is subtracted from each of these measured thickness values. From the resultant net thickness values of the specimen, the coefficient of variation of the thickness of the reinforcing fibers in the fiber-reinforced composite material shaped product can be determined using equation (3). Meanwhile, the degree of thickness unevenness of the reinforcing-fiber mat in the fiber-reinforced composite material shaped product also is maintained from those of the random mat.

Process for Producing the Random Mat

A preferred process for producing the random mat of the invention includes the following processes 1 to 4.
1. Process for cutting reinforcing fibers (cutting process)
2. Process in which the cut reinforcing fibers are introduced into a tube, conveyed with air, and sprayed (spraying process)
3. Process in which the sprayed reinforcing fibers are fixed to obtain a reinforcing-fiber mat (fixing process)
4. Process in which a thermoplastic resin is added to the reinforcing-fiber mat to obtain a random mat (thermoplastic-resin addition process)

Cutting Process

Figure 2:
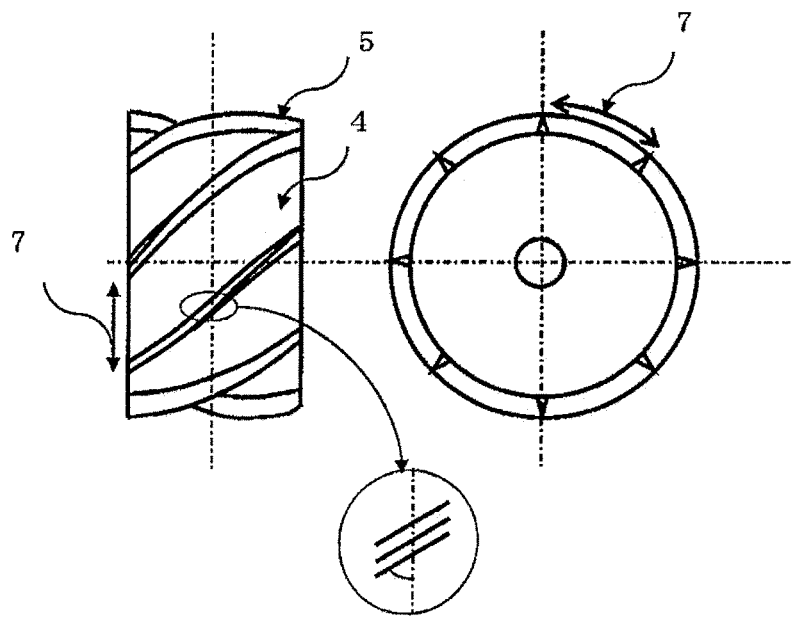
FIG. 2 is schematic views which diagrammatically illustrate a front view and a cross-sectional view of one example of preferred rotary cutters.

The process of cutting reinforcing fibers is described. Preferred as the reinforcing fibers to be cut are the so-called strands, which are in the form of bundles of long single fibers, because the strands are easily available and handleable. The cutting of reinforcing fibers preferably is the process of cutting the reinforcing fibers using a knife, e.g., a rotary cutter. One example of the cutting process using a rotary cutter is shown in FIG. 1. The knife angle for continuously cutting the reinforcing fibers is not particularly limited. General blades arranged at an angle of 90 degrees with the fibers may be used, or obliquely arranged blades or spirally arranged blades may be used. An example of rotary cutters having spiral knives is shown in FIG. 2.

Figure 3:
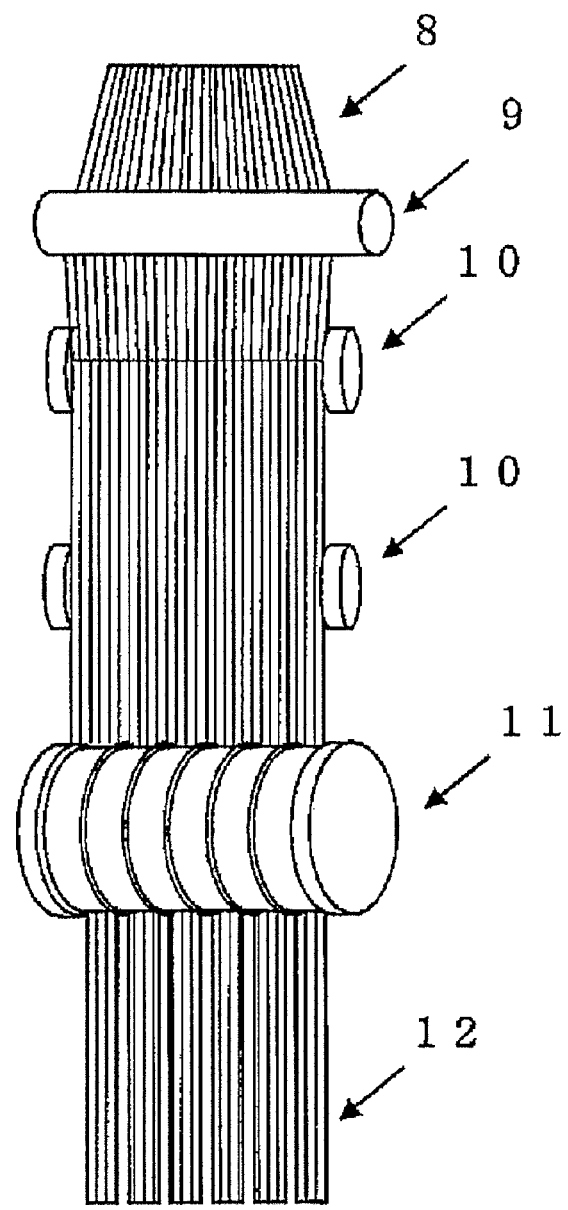
FIG. 3 is a schematic view which illustrates a preferred example of methods for widening/separating fibers.

Since the random mat of the invention is characterized in that the reinforcing fibers have a controlled small size as described above, it is preferred to control the size such as fiber width and fiber thickness, of the reinforcing fibers to be subjected to the cutting process, by any of the widening methods and separating methods described below (see FIG. 3 as well).

Methods for widening the fibers are not particularly limited. Examples thereof include a method in which a widening spreader such as a convex pin is pushed against the fibers, a method in which an air flow is passed in a direction crossing the running direction of the fibers, thereby bending the fibers so as to arch leeward, and a method in which the fibers are vibrated. It is preferable that the widened reinforcing fibers should be regulated so as to have a desired fiber width by providing, at a later stage, a control roller for regulating the fiber width.

It is also preferable, in the production of the random mat of the invention, that the reinforcing fibers which have been thus widened should be separated so as to result in a smaller reinforcing-fiber width.

Methods for separating the fibers are not particularly limited, and examples thereof include a method in which the strand is divided into thin bundles with a slitter. In the case of separating the fibers using a slitter, a suitable method for obtaining fibers having a desired fiber width is to regulate the slit spacing. Furthermore, with respect to slitting blades, a more preferred method for controlling fiber width is to pass the reinforcing fibers having a certain fiber width through knife-shaped slitting blades, thereby splitting the fibers, or to pass those reinforcing fibers through comb-shaped slitter to sort the fibers. It is also possible to select a sizing agent for the reinforcing fibers and separate the reinforcing fibers, thereby making it easy to obtain reinforcing fibers having a desired average number of fibers.

By conducting fiber separating subsequently to fiber widening in the manner described above, the reinforcing fibers can be controlled so as to be small and be similar in fiber width. Consequently, the reinforcing fibers contained in the random mat show excellent development of the reinforcing function, and the random mat obtained has improved homogeneity, reduced thickness unevenness, and excellent mechanical strength.

Spraying Process

Subsequently, a process is conducted in which the cut reinforcing fibers are introduced into a tapered tube located at a downstream side from the cutter and are sprayed. Methods for conveying the reinforcing fibers to the tapered tube are not particularly limited. It is, however, preferred to generate a suction wind velocity within the tapered tube to convey the reinforcing fibers into the tapered tube by air.

It is also preferable that in the spraying process, compressed air be directly blown against the reinforcing fibers to thereby suitably widen the distribution of reinforcing-fiber widths. The width of the distribution may be controlled by regulating the pressure of the compressed air being blown.

It is preferable that the conveyed reinforcing fibers should be sprayed on a breathable sheet arranged under a spray apparatus. Also from the standpoint of the fixing process described below, it is preferred to spray the reinforcing fibers on a movable breathable sheet having a suction mechanism.

In the spraying process, the cut reinforcing fibers may be sprayed on a sheet simultaneously with a fibrous or powder thermoplastic resin. This method is suitable for obtaining a random mat including both reinforcing fibers and a thermoplastic resin.

Fixing Process

Subsequently, the sprayed reinforcing fibers are fixed to obtain a reinforcing-fiber mat. Specifically, a preferred method is to fix the sprayed reinforcing fibers by suctioning air from under the breathable sheet and thereby obtain a reinforcing-fiber mat. Also even in the case where a fibrous or powder thermoplastic resin is sprayed simultaneously with the reinforcing fibers, the thermoplastic resin is fixed together with the reinforcing fibers. This processing in the fixing process may be conducted in the spraying process successively to the spraying of the reinforcing fibers, or the like.

Thermoplastic-Resin Addition Process

The thermoplastic-resin addition process may be conducted simultaneously with processes 1 to 3 described above. For example, a thermoplastic resin in a powder or another form may be sprayed in the spraying process. In the case where a reinforcing-fiber mat has been produced without adding a thermoplastic resin during processes 1 to 3 described above, a thermoplastic resin in the form of a sheet, film, or the like can be placed on or layered to the reinforcing-fiber mat to obtain a random mat of the invention. In this case, the thermoplastic resin in the form of a sheet or a film may be in a molten state.

Meanwhile, a thermoplastic resin in the form of a sheet, film, powder, or the like may be placed on or layered to the random mat obtained through the spraying of a thermoplastic resin in a powder or another form in the spraying process, as in the case described above.

Manufacture of Fiber-Reinforced Composite Material Shaped Product

A fiber-reinforced composite material shaped product can be obtained by molding the random mat of the invention. Examples of methods for obtaining the fiber-reinforced composite material shaped product include a method in which the random mat obtained in the manner described above is heated and pressed with a pressing machine or the like to obtain the shaped product. Although there are no particular limitations on methods for obtaining the fiber-reinforced composite material shaped product of the invention, a suitable method for obtaining the shaped product is to mold the random mat by, for example, vacuum forming, hydraulic forming, hot pressing, or cold pressing. A suitable method, among these, for obtaining the fiber-reinforced composite material shaped product of the invention is molding by cold pressing in which the random mat is heated to or above the melting point or glass transition point of the thermoplastic resin contained therein and is then sandwiched between molds kept at a temperature not higher than the melting point or glass transition point of the resin, thereby obtaining a shape.

It is preferable, in the molding of the random mat, that the random mat should have been heated in advance to a temperature which is the melting point or more of the thermoplastic resin as a matrix in cases when the resin is crystalline, or which is the glass transition point or more of the thermoplastic resin in cases when the resin is amorphous, and which is preferably not higher than the decomposition point of the thermoplastic resin. The pressing medium may have been regulated so as to have a temperature of the melting point or more or glass transition point or more, of the thermoplastic resin as a matrix, or may have been regulated so as to have a temperature of the melting point or less or glass transition point or less thereof. Furthermore, by suitably adding a thermoplastic resin during the molding, fiber-reinforced composite material shaped products which differ in thickness depending on purposes can be obtained. The thermoplastic resin to be added is not particularly limited, and examples thereof include the same thermoplastic resins as those enumerated above in the section Matrix Resin. With respect to the form of the resin also, use can be made of a molten resin or a resin in the form of fibers, powder, film, or the like.

These random mats of the invention as such may be used as preforms, or may be converted to shaped plates and then to shaped products having a final form.

EXAMPLES

Examples are shown below, but the invention should not be construed as being limited to the following Examples. With respect to reinforcing fibers and specimens thereof, the units of fiber length, fiber width, and fiber thickness are mm and the unit of weight is g, unless otherwise indicated. The densities of the carbon fibers and thermoplastic resins used in the following Examples and Comparative Examples are as follows.

PAN-based carbon fibers "Tenax" (registered trademark) STS40-24K: 1.75 g/cm$^3$

PAN-based carbon fibers "Tenax" (registered trademark) IMS60-24K: 1.80 g/cm$^3$

PAN-based carbon fibers "Tenax" (registered trademark) HTS40-12K: 1.76 g/cm$^3$

PAN-based carbon fibers "Tenax" (registered trademark) UTS50-24K: 1.79 g/cm$^3$

PAN-based carbon fibers "Tenax" (registered trademark) HTS40-6K: 1.76 g/cm$^3$

Polypropylene: 0.91 g/cm$^3$

Polycarbonate: 1.20 g/cm$^3$

Polyamide-6: 1.14 g/cm$^3$

Method for Determining Number-average Fiber Width and Weight-average Fiber Width of Reinforcing Fibers in Random Mat The random mat is cut into 100 mm×100 mm, and 300 reinforcing fibers are randomly taken out with a tweezers. With respect to the reinforcing fibers taken out, the fiber width ($W_i$), fiber weight ($w_i$), and fiber thickness ($t_i$) of each fiber are measured and recorded. For the measurements of fiber width and fiber thickness, a vernier caliper capable of measuring down to 1/100 mm is used. For weight measurement, a balance capable of measuring down to 1/100 mg is used. With respect to reinforcing fibers which were too small to measure the weight thereof, reinforcing fibers having the same fiber width were put together and weighed. In the case where two or more kinds of reinforcing fibers are used, the fibers are sorted by kinds, and the measurement and evaluation are made for each kind.

After the measurements of fiber width ($W_i$) and fiber weight ($w_i$) with respect to all the fibers taken out, the number-average fiber width (Wn) is determined using the following equation (4).

$$Wn = \Sigma W_i / I \qquad (4)$$

I is the number of reinforcing fibers, and the value thereof is 300 except for the case where the number of the fibers is less than 300.

Furthermore, the weight-average fiber width (Ww) of the reinforcing fibers is determined from the total weight (w) of the reinforcing fibers using the following equation (5).

$$Ww = \Sigma(W_i \times w_i / w) \qquad (5)$$

In cases when the reinforcing fibers are unable to be separated from the thermoplastic resin to raise difficulties in the measurements, the thermoplastic resin is removed, for example, by heating the random mat, for example, at 500° C. for about 1 hour and the measurements are thereafter performed.

Method for Determining Dispersion Ratio (Ww/Wn) of Reinforcing Fibers

The average-fiber-width dispersion ratio (Ww/Wn) is determined from the number-average fiber width (Wn) and weight-average fiber width (Ww) of the reinforcing fibers obtained, using the following equation (6).

$$\text{Average-fiber-width dispersion ratio } (Ww/Wn) = \text{(weight-average fiber width } (Ww))/(\text{number-average fiber width } (Wn)) \qquad (6)$$

Method for Determining Weight-Average Fiber Thickness of Reinforcing Fibers in Random Mat All the reinforcing fibers taken out are subjected to measurements of fiber thickness ($t_i$) and fiber weight ($w_i$) in the manner described above, and the weight-average fiber thickness (t) is thereafter determined using the following equation (7).

$$t = \Sigma(t_i \times w_i / w) \qquad (7)$$

Method for Determining Number-Average Fiber Width and Weight-average Fiber Width of Reinforcing Fibers in Fiber-Reinforced Composite Material Shaped Product The average fiber widths of the reinforcing fibers in the fiber-reinforced composite material shaped product are determined by cutting the shaped composite material into 100 mm×100 mm, heating the cut piece in an oven at 500° C. for about 1 hour to remove the resin, subsequently taking out fibers in the same manner as for the random mat, and measuring the fiber width (K), fiber weight ($w_i$), and the like.

Method for Determining Average Fiber Length L in Reinforcing-Fiber Mat or Random Mat A hundred reinforcing fibers are randomly taken out from the reinforcing-fiber mat or random mat using a tweezers, and the fiber length $L_i$ of each reinforcing fiber is measured using a vernier caliper down to 1 mm and recorded. It is preferable that the area over which reinforcing fibers are taken out should be sufficiently large as compared with the fiber lengths.

From the individual fiber lengths $L_i$ obtained, the average fiber length L is determined using the following expression.

$$L = \Sigma L_i / 100$$

In cases when the reinforcing fibers are unable to be separated from the thermoplastic resin to raise difficulties in the measurements, the thermoplastic resin is removed, for example, by heating the random mat, for example, at 500° C. for about 1 hour and the measurements are thereafter performed.

Method for Determining Thickness Unevenness of Reinforcing-Fiber Mat in Random Mat The coefficient of variation CV of the thickness of the reinforcing-fiber mat in the random mat was calculated in the following manner, and the thickness unevenness was evaluated on the basis of the results. The higher the coefficient of variation CV (%) is, the larger the thickness unevenness of the fibers is.

Meanwhile, in cases when the thermoplastic resin is unable to be separated from the random mat, making it impossible to determine the thickness unevenness of the reinforcing-fiber mat, the thermoplastic resin is removed by heating in the same manner as for the fiber-reinforced composite material shaped product described below and the measurement is thereafter performed.

1) The random mat is cut into 100 mm×100 mm, and the thermoplastic resin is separated. The reinforcing-fiber mat is put into a sealable bag, which is depressurized to −0.09 MPa or less.
2) Marks are put on the bag at intervals of 10 mm in a lattice pattern, and the thickness is measured with a micrometer down to 1/1,000 mm. The measurement is made on five lines×five rows, i.e., on 25 points.
3) The thickness of the bag is subtracted from each measured thickness, and an average value and a standard deviation are calculated. The coefficient of variation CV of the fiber thickness is calculated using the following expression.

$$\text{Coefficient of variation CV (\%)} = [(\text{standard deviation})/(\text{average value})] \times 100 \qquad (3)$$

Method for Determining Thickness Unevenness of Reinforcing-Fiber Mat in Fiber-Reinforced Composite Material Shaped Product In the case where the reinforcing-fiber mat of the fiber-reinforced composite material shaped product is evaluated for thickness unevenness, the fiber-reinforced composite material shaped product of a flat plate shape is cut into 100 mm×100 mm, and this cut piece is heated in an oven at 500° C. for about 1 hour to remove the thermoplastic resin. Thereafter, dimensions of the resultant mat are measured in the same manner and placed on a smooth flat plate. Subsequently, the each flat plate is put into a sealable bag and thickness measurement is conducted on 25 points in the same manner as for the random mat, except that the thicknesses of both the bag and the flat plate are subtracted from each measurement thickness. Thus, the coefficient of variation CV of the thickness was determined.

Evaluation of the Degree of Impregnation with Thermoplastic Resin in Fiber-Reinforced Composite Material Shaped Product (Shaped Plate)

The degree of impregnation in the fiber-reinforced composite material shaped product (shaped plate) is evaluated through an ultrasonic flaw detection test. The degree of impregnation was evaluated by conducting a flaw detection test with an ultrasonic flaw detection imaging device (SDS-WIN; Krautkramer Japan Co., Ltd.) under the conditions of a flaw-detector frequency of 5 MHz and a scanning pitch of 2.0 mm×2.0 mm. In the evaluation, a cross-section of a portion where the reflected-wave intensity was 90% or higher was subjected to a microscopic examination to ascertain that there were no defects or voids therein. The larger the area proportion of portions having a high reflected-wave intensity (70% or higher in the Examples) in the flaw detection test is, the denser the inner part of the shaped plate is and the higher the degree of impregnation with the thermoplastic resin in the shaped plate is. Meanwhile, the larger the area proportion of portions having a low reflected-wave intensity (50% or less in the Examples) is, the larger the amount of fine voids present in the inner part of the shaped plate is and the larger the amount of unimpregnated portions in the shaped plate is.

Tensile Test

Test pieces were cut out of the fiber-reinforced composite material shaped product (shaped plate) using a water jet and examined for tensile strength and tensile modulus in reference to JIS K 7164 using a universal testing machine manufactured by Instron Corp. The shape of the test pieces was type 1B-B. The chuck-to-chuck distance was 115 mm, and the test speed was 10 mm/min. The test pieces were cut out along an arbitrary direction (0-degree direction) and along the direction perpendicular thereto (90-degree direction), and the tensile strength and tensile modulus were measured for each in the two directions. With respect to the tensile modulus, the ratio (Eδ) obtained by dividing the larger value by the smaller value was calculated.

Calculation of Development Rate of Property Relative to Theoretical Strength

The development rate of property (%) relative to a theoretical value was determined from the tensile strength of the shaped plate obtained in the manner described above and from the tensile strength of the reinforcing fibers (carbon fibers) included in the shaped plate, through the following calculation.

Development rate of property (%)=[(tensile strength of shaped product)/(theoretical strength of shaped product)]×100

Here, the theoretical strength of the shaped product was determined from the tensile strength ($F_f$) of the reinforcing fibers contained in the shaped product, the breaking stress ($\sigma m$) of the matrix resin, the volume content ratio (Vf) of the reinforcing fibers, and the coefficient of orientation ($\eta_\theta$) of the fibers on the basis of a law of mixture regarding the strength of composite materials, using the following expression.

Theoretical strength of shaped product (MPa)=($\eta_\theta \times F_f \times Vf$)+$\sigma_m(1-Vf)$ (Here, the coefficient of orientation $\eta_\theta$ 110 was used $\eta_\theta = 3/8$, which is the value for in-plane random orientation.)

Example 1

As reinforcing fibers, PAN-based carbon fiber strand "Tenax" (registered trademark) STS40-24K (fiber diameter, 7.0 μm; fiber width 10 mm; tensile strength, 4,000 MPa), manufactured by Toho Tenax Co., Ltd., was subjected to fiber widening to increase the width thereof to 22 mm. Before being subjected to treatment with a separation apparatus, the widened reinforcing-fiber strand was passed through rollers having an inner width of 20 mm to thereby regulate the fiber width precisely to 20 mm. Disk-shaped separation blades made of a cemented carbide were used as the separation apparatus to slit the 20 mm-wide reinforcing-fiber strand at intervals of 0.8 mm. Furthermore, a rotary cutter made of a cemented carbide and equipped with blades at intervals of 20 mm was used as a cutting device to cut the slit strand so as to result in a fiber length of 20 mm. A tapered tube was arranged just under the rotary cutter. Compressed air was supplied into this tapered tube to thereby introduce the reinforcing fibers into the tapered tube and convey the fibers therethrough at a suction wind velocity of 5 m/sec. Polypropylene (J-106G, manufactured by Prime Polymer Co., Ltd.) which had been pulverized and classified so as to have an average particle diameter of 500 μm was supplied as a matrix resin through the sidewall of the tapered tube. Subsequently, a movable conveyor net was arranged under the outlet of the tapered tube, and the reinforcing fibers were supplied thereto from the tapered tube while conducting suction with a blower arranged under the net, thereby obtaining a random mat having a fiber areal weight of 1,500 g/m². The form of the reinforcing fibers in the random mat was examined and, as a result, it was found that the fiber axes of the reinforcing fibers were substantially parallel to a plane of the random mat and the reinforcing fibers were randomly dispersed in the plane.

In the random mat obtained, the reinforcing fibers had an average fiber length of 20 mm and a weight-average fiber thickness of 0.06 mm. The reinforcing fibers constituting the random mat had a weight-average fiber width (Ww) of 0.66 mm, a number-average fiber width (Wn) of 0.43 mm, and a dispersion ratio (Ww/Wn) of 1.52.

The random mat obtained was heated at 4.0 MPa for 10 minutes with a pressing device heated at 220° C., thereby obtaining a shaped plate having a thickness of 1.9 mm. The shaped plate obtained was evaluated for the thickness unevenness of the reinforcing-fiber mat. As a result, the coefficient of variation CV of the thickness was found to be 6.4%. Furthermore, the ultrasonic flaw detection test was conducted and, as a result, portions in which the reflected-wave intensity was 70% or higher were observed in a ratio of 80% or more.

In the shaped plate obtained, the volume content ratio of the reinforcing fibers was 45 vol %. The shaped plate was evaluated for tensile property in accordance with JIS 7164 and, as a result, the shaped plate was found to have a tensile strength of 490 MPa, a development rate of properties relative to theoretical strength of 73%, and a tensile modulus ratio between 0-degree direction and 90-degree direction of 1.06.

Example 2

As reinforcing fibers, PAN-based carbon fiber strand "Tenax" (registered trademark) IMS60-24K (fiber diameter, 5.0 μm; fiber width 10 mm; tensile strength, 5,800 MPa), manufactured by Toho Tenax Co., Ltd., was subjected to fiber widening to increase the width thereof to 26 mm. Before being subjected to treatment with a separation apparatus, the widened reinforcing-fiber strand was passed through rollers having an inner width of 25 mm to thereby regulate the fiber width precisely to 25 mm. Disk-shaped separation blades made of a cemented carbide were used as the separation apparatus to slit the 25 mm-wide reinforcing-fiber strand at intervals of 1.4 mm. Furthermore, a rotary cutter made of a cemented carbide and equipped with blades at intervals of 45 mm was used as a cutting device to cut the slit strand so as to result in a fiber length of 45 mm. A tapered tube was arranged just under the rotary cutter. Compressed air was supplied into this tapered tube to thereby introduce the reinforcing fibers into the tapered tube and convey the fibers therethrough at a suction wind velocity of 5 m/sec. A polycarbonate ("Panlite" (registered trademark) L-1225Y, manufactured by Teijin Chemicals Ltd.) which had been pulverized and classified so as to have an average particle diameter of 500 μm was supplied as a matrix resin through the sidewall of the tapered tube. Subsequently, a movable conveyor net was arranged under the outlet of the tapered tube, and the reinforcing fibers were supplied thereto from the tapered tube while conducting suction with a blower arranged under the net, thereby obtaining a random mat having a fiber areal weight of 2,500 g/m². The form of the reinforcing fibers in the random mat was examined and, as a result, it was found that the fiber axes of the reinforcing fibers were substantially parallel with a plane of the random mat and the reinforcing fibers were randomly dispersed in the plane.

In the random mat obtained, the reinforcing fibers had an average fiber length of 45 mm and a weight-average fiber thickness of 0.05 mm. The reinforcing fibers constituting the random mat had a weight-average fiber width (Ww) of 1.25 mm, a number-average fiber width (Wn) of 0.69 mm, and a dispersion ratio (Ww/Wn) of 1.80.

The random mat obtained was heated at 4.0 MPa for 10 minutes with a pressing device heated at 300° C., thereby obtaining a shaped plate having a thickness of 4.0 mm. The shaped plate obtained was evaluated for the thickness unevenness of the reinforcing-fiber mat. As a result, the coefficient of variation CV of the thickness was found to be 9.0%. Furthermore, the ultrasonic flaw detection test was conducted and, as a result, portions in which the reflected-wave intensity was 70% or higher were observed in a ratio of 80% or more.

In the shaped plate obtained, the volume content ratio of the reinforcing fibers was 35 vol %. The shaped plate was evaluated for tensile property in accordance with JIS 7164 and, as a result, the shaped plate was found to have a tensile strength of 540 MPa, a development rate of properties relative to theoretical strength of 71%, and a tensile modulus ratio between 0-degree direction and 90-degree direction of 1.07.

Example 3

As reinforcing fibers, PAN-based carbon fiber strand "Tenax" (registered trademark) STS40-24K (fiber diameter, 7.0 μm; fiber width 10 mm; tensile strength, 4,000 MPa), manufactured by Toho Tenax Co., Ltd., was subjected to fiber widening to increase the width thereof to 16 mm. Before being subjected to treatment with a separation apparatus, the widened reinforcing-fiber strand was passed through rollers having an inner width of 15 mm to thereby regulate the fiber width precisely to 15 mm. Disk-shaped separation blades made of a cemented carbide were used as the separation apparatus to slit the 15 mm-wide reinforcing-fiber strand at intervals of 0.5 mm. Furthermore, a rotary cutter made of a cemented carbide and equipped with blades at intervals of 12 mm was used as a cutting device to cut the slit strand so as to result in a fiber length of 12 mm. A tube having a small hole was prepared as a spray apparatus, and compressed air was supplied thereto using a compressor. In this stage, the velocity of the wind discharged through the small hole was 50 msec. Furthermore, a tapered tube was arranged under the spray apparatus. Subsequently, a movable conveyor net was arranged under the outlet of the tapered tube, and the reinforcing fibers were supplied thereto from the tapered tube while conducting suction with a blower arranged under the net, thereby obtaining a reinforcing-fiber mat having a fiber areal weight of 700 g/m². The form of the reinforcing fibers in the reinforcing-fiber mat was examined and, as a result, it was found that the fiber axes of the reinforcing fibers were substantially parallel to a plane of the random mat and the reinforcing fibers were randomly dispersed in the plane.

Subsequently, a molten matrix resin was supplied to the surface of the mat. Specifically, a polyamide-6 resin (A1030, manufactured by Unichika, Ltd.) was used as a matrix resin and melted, and the molten resin of a film shape having a thickness of 0.6 mm was extruded, at the same speed as the conveyor line speed, from a T-die having a width of 1 m and arranged over the conveyor net at a distance of 5 cm therefrom and was supplied to the whole surface of the mat. In this operation, that portion of the surface of the reinforcing-fiber mat to which the resin was being supplied was heated with an infrared ray heater to prevent the resin from cooling and solidifying.

The apparatus was operated under such conditions that the reinforcing-fiber supply amount was set at 1,400 g/min and the matrix-resin supply amount was set at 1,360 g/min. As a result, a random mat constituted by the reinforcing fibers and the thermoplastic resin was formed on the fixing net. Subsequently, this mat was heated and pressed with a pair of heating rollers having a set temperature of 280° C., thereby obtaining a random mat in which the resin was evenly impregnated.

In the random mat obtained, the reinforcing fibers had an average fiber length of 12 mm and a weight-average fiber thickness of 0.06 mm. The reinforcing fibers constituting the random mat had a weight-average fiber width (Ww) of 0.32 mm, a number-average fiber width (Wn) of 0.16 mm, and a dispersion ratio (Ww/Wn) of 1.96.

The random mat obtained was heated at 4.0 MPa for 10 minutes with a pressing device heated at 260° C., thereby obtaining a shaped plate having a thickness of 1.0 mm.

The shaped plate obtained was evaluated for the thickness unevenness of the reinforcing-fiber mat. As a result, the coefficient of variation CV of the thickness was found to be 6.8%. Furthermore, the ultrasonic flaw detection test was conducted and, as a result, portions in which the reflected-wave intensity was 70% or higher were observed in a ratio of 80% or more.

In the shaped plate obtained, the volume content ratio of the reinforcing fibers was 40 vol %. The shaped plate was evaluated for tensile property in accordance with JIS 7164 and, as a result, the shaped plate was found to have a tensile strength of 440 MPa, a development rate of properties relative to theoretical strength of 73%, and a tensile modulus ratio between 0-degree direction and 90-degree direction of 1.04.

Example 4

As reinforcing fibers, PAN-based carbon fiber strand "Tenax" (registered trademark) HTS40-12K (fiber diameter 7.0 μm; fiber width 8 mm; tensile strength, 4,200 MPa), manufactured by Toho Tenax Co., Ltd., was subjected to fiber widening to increase the width thereof to 16 mm. Before being subjected to treatment with a separation apparatus, the widened reinforcing-fiber strand was passed through rollers having an inner width of 15 mm to thereby regulate the fiber width precisely to 15 mm. Disk-shaped separation blades made of a cemented carbide were used as the separation apparatus to slit the 15 mm-wide reinforcing-fiber strand at intervals of 0.5 mm. Furthermore, a rotary cutter made of a cemented carbide and equipped with blades at intervals of 15 mm was used as a cutting device to cut the slit strand so as to result in a fiber length of 15 mm. A tapered tube was arranged just under the rotary cutter. Compressed air was supplied into this tapered tube to introduce the fibers into the tapered tube and convey the fibers therethrough at a suction wind velocity of 5 m/sec. A polycarbonate ("Panlite" (registered trademark) L-1225Y, manufactured by Teijin Chemicals Ltd.) which were pulverized and classified so as to have an average particle diameter of 500 μm was supplied as a matrix resin through the sidewall of the tapered tube. Subsequently, a movable conveyor net was arranged under the outlet of the tapered tube, and the reinforcing fibers were supplied thereto from the tapered tube while conducting suction with a blower arranged under the net, thereby obtaining a random mat having a fiber areal weight of 2,640 g/m². The form of the reinforcing fibers in the random mat was examined and, as a result, it was found that the fiber axes of the reinforcing fibers were substantially parallel to a plane of the random mat and the reinforcing fibers were randomly dispersed in the plane.

In the random mat obtained, the reinforcing fibers had an average fiber length of 15 mm and a weight-average fiber thickness of 0.04 mm. The reinforcing fibers constituting the random mat had a weight-average fiber width (Ww) of 0.47 mm, a number-average fiber width (Wn) of 0.36 mm, and a dispersion ratio (Ww/Wn) of 1.31.

The random mat obtained was heated at 4.0 MPa for 10 minutes with a pressing device heated at 300° C., thereby obtaining a shaped plate having a thickness of 3.0 mm. The shaped plate obtained was evaluated for the thickness unevenness of the reinforcing-fiber mat. As a result, the coefficient of variation CV of the thickness was found to be 5.6%. Furthermore, the ultrasonic flaw detection test was conducted and, as a result, portions in which the reflected-wave intensity was 70% or higher were observed in a ratio of 80% or more.

In the shaped plate obtained, the volume content ratio of the reinforcing fibers was 50 vol %. The shaped plate was evaluated for tensile property in accordance with JIS 7164 and, as a result, the shaped plate was found to have a tensile strength of 585 MPa, a development rate of properties relative to theoretical strength of 74%, and a tensile modulus ratio between 0-degree direction and 90-degree direction of 1.04.

Comparative Example 1

As reinforcing fibers, PAN-based carbon fiber strand "Tenax" (registered trademark) HTS40-12K (fiber diameter, 7.0 μm; fiber width 8 mm; tensile strength, 4,200 MPa), manufactured by Toho Tenax Co., Ltd., was subjected to fiber widening to increase the width thereof to 16 mm. Before being subjected to treatment with a separation apparatus, the widened reinforcing-fiber strand was passed through rollers having an inner width of 15 mm to thereby regulate the fiber width precisely to 15 mm. Disk-shaped separation blades made of a cemented carbide were used as the separation apparatus to slit the reinforcing-fiber strand at intervals of 3.2 mm. Furthermore, a rotary cutter made of a cemented carbide and equipped with blades at intervals of 15 mm was used as a cutting device to cut the slit strand so as to result in a fiber length of 15 mm. A tapered tube was arranged just under the rotary cutter. Compressed air was supplied into this tapered tube to introduce the fibers into the tapered tube and convey the fibers therethrough at a suction wind velocity of 5 m/sec. A polycarbonate ("Panlite" (registered trademark) L-1225Y, manufactured by Teijin Chemicals Ltd.) which were pulverized and classified so as to have an average particle diameter of 500 μam was supplied as a matrix resin through the sidewall of the tapered tube. Subsequently, a movable conveyor net was arranged under the outlet of the tapered tube, and the reinforcing fibers were supplied thereto from the tapered tube while conducting suction with a blower arranged under the net, thereby obtaining a random mat having a fiber areal weight of 2,640 g/m². The form of the reinforcing fibers in the random mat was examined and, as a result, it was found that the fiber axes of the reinforcing fibers were substantially parallel to a plane of the random mat and the reinforcing fibers were randomly dispersed in the plane.

In the random mat obtained, the reinforcing fibers had an average fiber length of 15 mm and a weight-average fiber thickness of 0.05 mm. The reinforcing fibers constituting the random mat had a weight-average fiber width (Ww) of 3.02 mm, a number-average fiber width (Wn) of 2.27 mm, and a dispersion ratio (Ww/Wn) of 1.33.

The random mat obtained was heated at 4.0 MPa for 10 minutes with a pressing device heated at 300° C., thereby obtaining a shaped plate having a thickness of 3.0 mm. The shaped plate obtained was evaluated for the thickness unevenness of the reinforcing-fiber mat. As a result, the coefficient of variation CV of the thickness was found to be 18.4%. Furthermore, the ultrasonic flaw detection test was conducted and, as a result, portions in which the reflected-wave intensity was 70% or higher were observed in a ratio of 80% or more.

In the shaped plate obtained, the volume content ratio of the reinforcing fibers was 50 vol %. The shaped plate was evaluated for tensile property in accordance with JIS 7164 and, as a result, the shaped plate was found to have a tensile strength of 420 MPa, a development rate of properties relative to theoretical strength of 53%, and a tensile modulus ratio between 0-degree direction and 90-degree direction of 1.16.

Example 5

As reinforcing fibers, PAN-based carbon fiber strand "Tenax" (registered trademark) UTS50-24K (fiber diameter, 6.9 μm; fiber width 10 mm; tensile strength, 5,000 MPa), manufactured by Toho Tenax Co., Ltd., was subjected to fiber widening to increase the width thereof to 22 mm. Before being subjected to treatment with a separation apparatus, the widened reinforcing-fiber strand was passed through rollers having an inner width of 20 mm to thereby regulate the fiber width precisely to 20 mm. Disk-shaped separation blades arranged at intervals of 2.6 mm and 2.2 mm alternately were used as the separation apparatus to slit the reinforcing-fiber strand. Furthermore, a rotary cutter made of a cemented carbide and equipped with blades at intervals of 30 mm was used as a cutting device to cut the slit strand so as to result in a fiber length of 30 mm. A tapered tube was arranged just under the rotary cutter. Compressed air was supplied into this tapered tube to introduce the fibers into the tapered tube and convey the fibers therethrough at a suction wind velocity of 5 m/sec. Polyamide-6 ("A1030", manufactured by Unichika, Ltd.) which was pulverized and classified so as to have an average particle diameter of 500 µm was supplied as a matrix resin through the sidewall of the tapered tube. Subsequently, a movable conveyor net was arranged under the outlet of the tapered tube, and the reinforcing fibers were supplied thereto from the tapered tube while conducting suction with a blower arranged under the net, thereby obtaining a random mat having a fiber areal weight of 4,000 g/m$^2$. The form of the reinforcing fibers in the random mat was examined and, as a result, it was found that the fiber axes of the reinforcing fibers were substantially parallel to a plane of the random mat and the reinforcing fibers were randomly dispersed in the plane.

In the random mat obtained, the reinforcing fibers had an average fiber length of 30 mm and a weight-average fiber thickness of 0.07 mm. The reinforcing fibers constituting the random mat had a weight-average fiber width (Ww) of 2.20 mm, a number-average fiber width (Wn) of 1.39 mm, and a dispersion ratio (Ww/Wn) of 1.58.

The random mat obtained was heated at 4.0 MPa for 10 minutes with a pressing device heated at 280° C., thereby obtaining a shaped plate having a thickness of 5.0 mm. The shaped plate obtained was evaluated for the thickness unevenness of the reinforcing-fiber mat. As a result, the coefficient of variation CV of the thickness was found to be 13.3%. Furthermore, the ultrasonic flaw detection test was conducted and, as a result, portions in which the reflected-wave intensity was 70% or higher were observed in a ratio of 80% or more.

In the shaped plate obtained, the volume content ratio of the reinforcing fibers was 45 vol %. The shaped plate was evaluated for tensile property in accordance with JIS 7164 and, as a result, the shaped plate was found to have a tensile strength of 550 MPa, a development rate of properties relative to theoretical strength of 65%, and a tensile modulus ratio between 0-degree direction and 90-degree direction of 1.09.

Comparative Example 2

As reinforcing fibers, PAN-based carbon fiber strand "Tenax" (registered trademark) UTS50-24K (fiber diameter, 6.9 µm; fiber width 10 mm; tensile strength, 5,000 MPa), manufactured by Toho Tenax Co., Ltd., was subjected to fiber widening to increase the width thereof to 22 mm. Before being subjected to treatment with a separation apparatus, the widened reinforcing-fiber strand was passed through rollers having an inner width of 20 mm to thereby regulate the fiber width precisely to 20 mm. A part of the reinforcing-fiber strand widened to a width of 20 mm was slit at intervals of 4.2 mm, and the other part thereof was slit at intervals of 0.3 mm. The two kinds of slit strands were supplied in the same amount to a cutting device. A rotary cutter made of a cemented carbide and equipped with blades at intervals of 20 mm was used as the cutting device to cut the slit strands so as to result in a fiber length of 20 mm.

A tapered tube was arranged just under the rotary cutter. Compressed air was supplied into this tapered tube to introduce the fibers into the tapered tube and convey the fibers therethrough at a suction wind velocity of 5 m/sec. Polyamide-6 ("A1030", manufactured by Unichika, Ltd.) which were pulverized and classified so as to have an average particle diameter of 500 µm was supplied as a matrix resin through the sidewall of the tapered tube. Subsequently, a movable conveyor net was arranged under the outlet of the tapered tube, and the carbon fibers were supplied thereto from the tapered tube while conducting suction with a blower arranged under the net, thereby obtaining a random mat having a fiber areal weight of 2,380 g/m$^2$. The form of the reinforcing fibers in the random mat was examined and, as a result, it was found that the fiber axes of the reinforcing fibers were substantially parallel to a plane of the random mat and the reinforcing fibers were randomly dispersed in the plane.

In the random mat obtained, the reinforcing fibers had an average fiber length of 20 mm and a weight-average fiber thickness of 0.06 mm. The reinforcing fibers constituting the random mat had a weight-average fiber width (Ww) of 2.21 mm, a number-average fiber width (Wn) of 0.54 mm, and a dispersion ratio (Ww/Wn) of 4.08.

The random mat obtained was heated at 4.0 MPa for 10 minutes with a pressing device heated at 280° C., thereby obtaining a shaped plate having a thickness of 3.0 mm. The shaped plate obtained was evaluated for the thickness unevenness of the reinforcing-fiber mat. As a result, the coefficient of variation CV of the thickness was found to be 16.2%. Furthermore, the ultrasonic flaw detection test was conducted and, as a result, portions in which the reflected-wave intensity was 70% or higher were observed in a ratio of 80% or more.

In the shaped plate obtained, the volume content ratio of the reinforcing fibers was 45 vol %. The shaped plate was evaluated for tensile property in accordance with JIS 7164 and, as a result, the shaped plate was found to have a tensile strength of 490 MPa, a development rate of properties relative to theoretical strength of 58%, and a tensile modulus ratio between 0-degree direction and 90-degree direction of 1.08.

Comparative Example 3

As reinforcing fibers, PAN-based carbon fiber strand "Tenax" (registered trademark) HTS40-6K (fiber diameter, 7.0 µm; fiber width 6 mm; tensile strength, 4,200 MPa), manufactured by Toho Tenax Co., Ltd., was used. A roving cutter equipped with blades at intervals of 6 mm was used to cut the reinforcing-fiber strand so as to result in a fiber length of 6 mm. These reinforcing fibers cut with the roving cutter were supplied to a conveyor net arranged just under the cutter, thereby obtaining a reinforcing-fiber mat having a fiber areal weight of 2,640 g/m$^2$. The form of the reinforcing fibers in the reinforcing-fiber mat was examined and, as a result, it was found that the fiber axes of the reinforcing fibers were substantially parallel to a plane of the random mat and the reinforcing fibers were randomly dispersed in the plane.

In the reinforcing-fiber mat obtained, the reinforcing fibers had an average fiber length of 6.1 mm and a weight-average fiber thickness of 0.05 mm. The reinforcing fibers constituting the reinforcing-fiber mat had a weight-average fiber width (Ww) of 5.81 mm, a number-average fiber width (Wn) of 5.25 mm, and a dispersion ratio (Ww/Wn) of 1.11.

A polycarbonate film ("Panlite" (registered trademark) L-1225Y, manufactured by Teijin Chemicals Ltd.) of 1,815 g/m$^2$ was layered on each surface of the reinforcing-fiber mat having reinforcing-fiber areal weight of 2,640 g/m$^2$, and the layered body was heated and pressed with a pair of heating roller having a set temperature of 300° C., thereby obtaining a random mat in which the resin was evenly impregnated.

The random mat obtained was heated at 4.0 MPa for 10 minutes with a pressing device heated at 300° C., thereby obtaining a shaped plate having a thickness of 3.1 mm. The shaped plate obtained was evaluated for the thickness unevenness of the reinforcing-fiber mat. As a result, the coefficient of variation CV of the thickness was found to be 32.4%. Furthermore, the ultrasonic flaw detection test was conducted and, as a result, portions in which the reflected-wave intensity was 70% or higher were observed in a ratio of 47%. It was ascertained that this shaped plate had unimpregnated portions inside.

In the shaped plate obtained, the volume content ratio of the reinforcing fibers was 49 vol %. The shaped plate was evaluated for tensile property in accordance with JIS 7164 and, as a result, the shaped plate was found to have a tensile strength of 380 MPa, a development rate of properties relative to theoretical strength of 48%, and a tensile modulus ratio between 0-degree direction and 90-degree direction of 1.32.

INDUSTRIAL APPLICABILITY

The random mat and fiber-reinforced composite material shaped product obtained according to the invention have excellent mechanical strength and are excellent in terms of the isotropy thereof. Consequently, the random mat and the shaped composite material are usable for or as various constituent members, e.g., inside plates, outside plates, and constituent members for motor vehicles, the frames or housings of various electrical products or machines, or the like.

While the invention has been described in detail and with reference to specific embodiments thereof, it will be apparent to one skilled in the art that various changes and modifications can be made therein without departing from the spirit and scope thereof.

This application is based on a Japanese patent application filed on Jul. 31, 2012 (Application No. 2012-169936), the contents thereof being incorporated herein by reference.

DESCRIPTION OF THE REFERENCE NUMERALS

1. Reinforcing fibers
2. Pinch roller
3. Rubber roller
4. Rotary cutter main body
5. Blade
6. Cut reinforcing fibers
7. Blade pitch
8. Widened reinforcing fibers
9. Widening device
10. Fiber-width control roller
11. Slitter for separating
12. Separated reinforcing fibers

The invention claimed is:

1. A process for producing a random mat comprising a reinforcing-fiber mat and a thermoplastic resin, the process comprising:
widening a reinforcing fiber strand; and the following steps (1) to (4):
(1) cutting off reinforcing fibers from the reinforcing fiber strand;
(2) introducing the cut reinforcing fibers into a tube, conveying the reinforcing fibers in the tube with air and spraying the reinforcing fibers from the tube;
(3) fixing the sprayed reinforcing fibers to obtain a reinforcing-fiber mat; and
(4) adding a thermoplastic resin to the reinforcing-fiber mat to obtain a random mat, wherein
the reinforcing fibers have an average fiber length of 3 to 100 mm;
the weight-average fiber thickness of the reinforcing fibers is 0.01 mm or more and 0.30 mm or less;
fiber axes of the reinforcing fibers are substantially parallel to a plane of the random mat;
the reinforcing fibers are randomly dispersed in the plane of the random mat; and
the reinforcing fibers satisfy the following i) to iii):
i) the reinforcing fibers have a weight-average fiber width (Ww) which satisfies the following equation (1):

$$0 \text{ mm} < Ww < 2.8 \text{ mm} \tag{1};$$

ii) the reinforcing fibers have an average-fiber-width dispersion ratio (Ww/Wn), which is defined as a ratio of the weight-average fiber width (Ww) to a number-average fiber width (Wn), of more than 1.00 and 2.00 or less; and
iii) the reinforcing fibers have a weight-average fiber thickness which is smaller than the weight-average fiber width (Ww).

2. The process for producing a random mat according to claim 1, further comprising:
separating the reinforcing fiber strand after the widening.

3. The process for producing a random mat according to claim 1, wherein
the steps (2) and (4) are performed simultaneously.

4. The process for producing a random mat according to claim 1, wherein
the step (4) includes supplying a molten thermoplastic resin having a sheet or film shape on the reinforcing-fiber mat obtained from the step (3).

5. The process for producing a random mat according to claim 1, wherein
the step (2) includes using a tapered tube, and generating a suction wind velocity within the tapered tube to convey the reinforcing fibers into the tapered tube by the air.

6. The process for producing a random mat according to claim 2,
wherein the separating of the reinforcing fiber strand includes slitting the reinforcing fiber strand into a first reinforcing fiber strand having a first width and a second reinforcing fiber strand having a second width which is different from the first width.

7. The process for producing a random mat according to claim 1,
wherein the widening is performed by pushing a widening spreader against the reinforcing fiber strand.

8. The process for producing a random mat according to claim 1,
wherein the widening is performed by passing an air flow in a direction crossing a running direction of the reinforcing fiber strand and bending the reinforcing fiber strand so as to arch leeward.

9. The process for producing a random mat according to claim 1,
wherein the widening is performed by vibrating the reinforcing fiber strand.

10. The process for producing a random mat according to claim 1,
   wherein the width of the widened reinforcing fiber strand is regulated by providing a control roller.

11. The process for producing a random mat according to claim 1,
   wherein the (4) adding a thermoplastic resin is performed simultaneously with the spraying of the reinforcing fibers and performed after spraying of the reinforcing fibers.

* * * * *